United States Patent [19]

Diekwisch

[11] Patent Number: 5,225,027
[45] Date of Patent: Jul. 6, 1993

[54] APPARATUS FOR THE PLASTICS COATING OF THREE-DIMENSIONAL SOLIDS

[76] Inventor: Rita Diekwisch, Im Grossen Siek 85, D-4900 Herford, Fed. Rep. of Germany

[21] Appl. No.: 213,702
[22] PCT Filed: Sep. 25, 1987
[86] PCT No.: PCT/EP87/00545
§ 371 Date: May 31, 1988
§ 102(e) Date: May 31, 1988
[87] PCT Pub. No.: WO88/02305
PCT Pub. Date: Apr. 7, 1988

[30] Foreign Application Priority Data

Sep. 29, 1986 [DE] Fed. Rep. of Germany ....... 3633097
Mar. 9, 1987 [DE] Fed. Rep. of Germany ... 8703503[U]

[51] Int. Cl.$^5$ .............................................. B32B 31/00
[52] U.S. Cl. ..................................... 156/382; 156/285; 156/475; 156/583.3; 264/511
[58] Field of Search ................. 156/212, 285, 475, 94, 156/213, 216, 286, 382, 583.3; 264/511; 425/388

[56] References Cited

U.S. PATENT DOCUMENTS

| | | | |
|---|---|---|---|
| 1,856,694 | 5/1932 | DeCorrevont | 156/382 |
| 2,419,758 | 4/1947 | Borkland | 156/85 |
| 3,305,618 | 2/1967 | Sucher et al. | 264/316 |
| 3,466,706 | 9/1969 | Asano | 425/388 X |
| 3,546,221 | 12/1970 | Johnson | 264/266 |
| 3,566,650 | 3/1971 | Johnson | 72/63 |
| 4,249,983 | 2/1981 | Fujii | 156/475 |
| 4,252,518 | 2/1981 | Kiefer | 425/388 |
| 4,416,716 | 11/1983 | Ichikawa et al. | 156/212 X |
| 4,447,282 | 5/1984 | Valerio et al. | 156/212 X |
| 4,692,199 | 9/1987 | Kozlowski | 156/285 X |
| 4,700,474 | 10/1987 | Choinski | 156/382 X |
| 4,806,195 | 2/1989 | Namysi | 156/382 |

FOREIGN PATENT DOCUMENTS

| | | |
|---|---|---|
| 1964051 | 3/1970 | Fed. Rep. of Germany . |
| 2353460 | 4/1975 | Fed. Rep. of Germany . |
| 2551768 | 5/1976 | Fed. Rep. of Germany . |
| 3017273 | 11/1981 | Fed. Rep. of Germany . |
| 1183353 | 12/1984 | Fed. Rep. of Germany . |
| 3338513 | 5/1985 | Fed. Rep. of Germany . |
| 1264154 | 5/1961 | France . |
| 1312836 | 12/1962 | France . |
| 1353079 | 2/1964 | France . |
| 2287317 | 5/1976 | France . |
| 472976 | 12/1937 | United Kingdom . |
| 925339 | 5/1963 | United Kingdom . |

Primary Examiner—David A. Simmons
Assistant Examiner—James J. Engel, Jr.
Attorney, Agent, or Firm—Foley & Lardner

[57] ABSTRACT

An apparatus and process for coating three-dimensional solids, particularly doors, with plastic is disclosed. A clamping frame is used to clamp a sheet of plastic, which is then coated onto the solid by a pressure cushion. The apparatus and process allow the plastic to conform to the solid without folds, even at the corners.

30 Claims, 4 Drawing Sheets

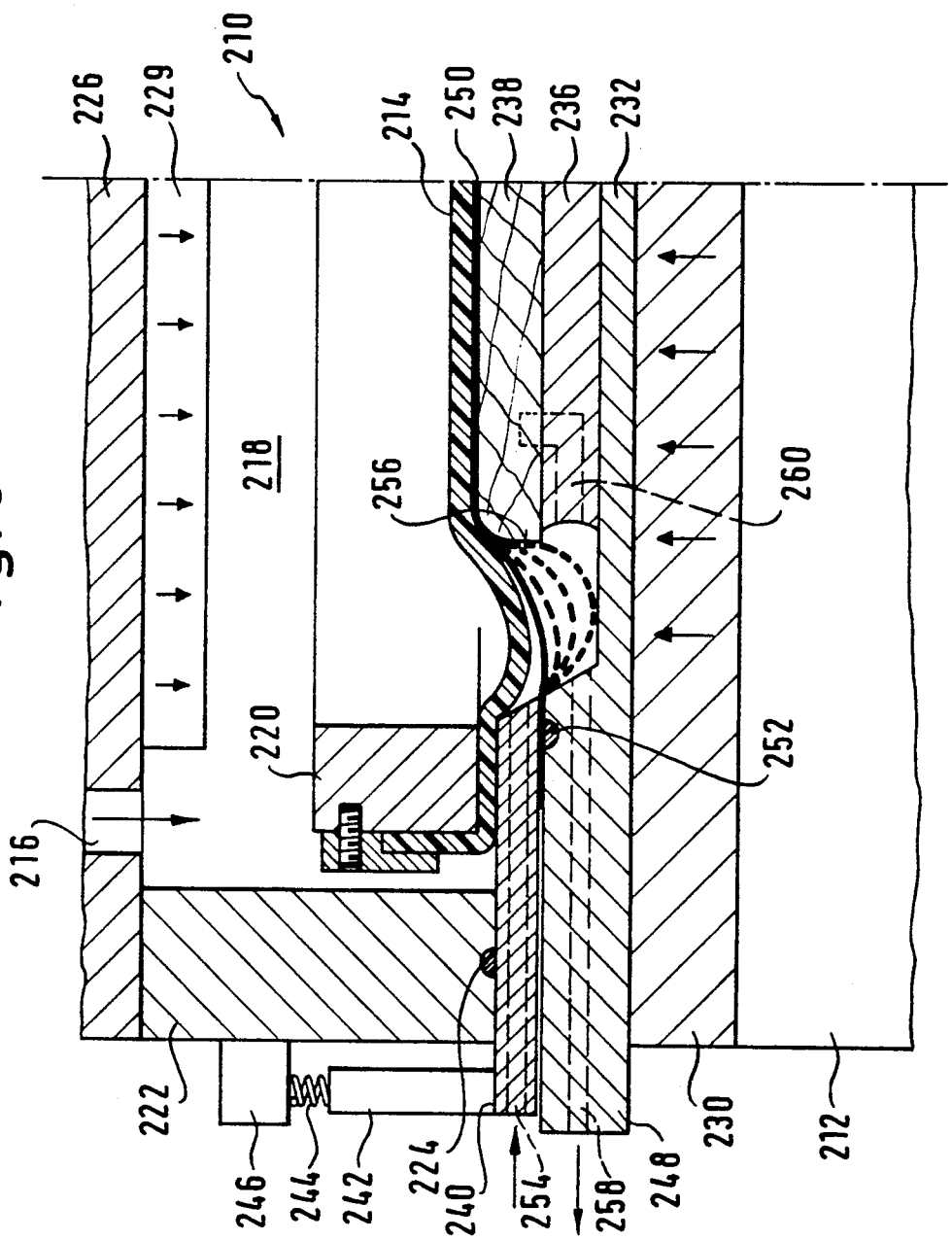

APPARATUS FOR THE PLASTICS COATING OF THREE-DIMENSIONAL SOLIDS

The invention relates to a process for the plastics coating of three-dimensional solids, in which a plastics sheet is laid onto a solid and pressed against it with the aid of a pressure cushion, with heating. Moreover, the invention relates to an apparatus for the implementation of this process.

Instead of some other surface treatment of a solid, for example a furniture component, it is frequently easier to coat the solid with a plastics sheet. This applies, for example, to chipboards in the furniture industry for the production of the individual components, in particular doors and front panels of closet furniture. Chipboards were initially coated with plastic overall on both sides and subsequently cut to size to form individual furniture components, the peripheral borders of which were then masked with the aid of so-called edge bands. In the case of furniture components in board form with sufficiently rounded-off corners and edges, under certain preconditions there is the possibility of simultaneously coating with a continuous plastics sheet for instance the front surface and two mutually opposite borders, as is specified for example in German Utility Model 8,631,961, in which there are no indications, however, of the coating process to be used. Veneers are applied in this way with the aid of pressure cushion presses, so-called membrane presses.

However, thus far there has not been any satisfactory success in simultaneously coating with continuous plastics sheet the entire peripheral borders of a board together with one main surface. This is due to the fact that an excess of material occurs in the plastics sheet at the corners or curves of the outer contour, which leads to the formation of folds and at the same time an inadequate adhesion of the plastics sheet. This can be remedied to a certain extent by cutting into the plastics sheet in the corner regions and fixing with overlap, but the cut lines generally remain visible in a disturbing way.

When coating solids with the aid of plastics sheets, apart from the use of a suitable adhesive, a heating of the plastics sheet is necessary. Membrane presses make such a heating possible by virtue of the fact that heat radiators or other suitable heating devices are arranged in the pressure space behind the membrane, so that, when it comes into contact with the membrane, the sheet is heated through the membrane. However, depending on the type of sheet used, this may result in it adhering to the membrane so strongly that, when the membrane is raised after the coating operation, it is again taken along by the membrane. This of course leads to considerable operating delays and costs. Further difficulties may arise in practice as a result of air pockets occurring when the membrane is laid onto the plastics sheet, in the region of which pockets the membrane cannot act with the necessary pressure on the plastics sheet.

The invention is based on the object of creating an apparatus of the type mentioned at the beginning which allows the three-dimensional solid, in particular a solid in board form, to be coated in one operation with a continuous plastics sheet on a main surface and the entire peripheral border with a plastics sheet without the formation of folds in the corners in a manner free from operational disruptions.

This object is achieved according to the invention in the case of a process of the type mentioned at the beginning in that the sheet is clamped by a frame surrounding the solid at a distance and the sheet is held by the frame during pressing with the pressure cushion.

The frame has the effect of tensioning and slightly stretching the sheet. An increased stretching takes place in the region of projections on the outline of the solid, for instance at the four corners of a rectangular board, at which folds occur in the case of the known process. By increased stretching in these regions, excess material is drawn off and at the same time the sheet is adapted to the contour of the solid.

An apparatus according to the invention for the implementation of this process comprises a table for receiving a solid to be coated and a lowerable pressure cushion for the pressing of a plastics sheet against the solid. The apparatus comprises a lowerable frame, following the outline of the solid at a distance, for clamping of the plastics sheet.

In the case of a further embodiment of the invention, the sheet is firmly clamped around the entire periphery of the solid by laying the frame onto the sheet and pressing it against the table. Therefore, during the subsequent heating and stretching of the sheet, only the sheet material lying on the solid and surrounding the latter in the form of a strip is available within the frame surface. The sheet material is therefore stretched to a considerable extent. This applies in particular to the region of corners of the solid, in which a still greater stretching takes place due to the greater diagonal distance between solid and frame in comparison with the lateral distance. In the course of this very strong deformation, the sheet material adapts itself completely to the corners of the solid, without folds forming.

Preferably, a lower frame part, which is assigned to the table and onto which the sheet is laid, and a congruent upper frame part, which is moved onto the sheet and, together with the lower frame part, clamps it, are provided. The lower frame part can remain permanently on the table or even be an integral part of the table.

The frame is preferably located in the effective area of the pressure cushion. In this case, no additional measures for pressing the frame or the upper frame part against the sheet are necessary. Rather, the frame, which rests on the sheet, is already engaged by the pressure cushion at the beginning of the pressing operation and is pressed firmly downward.

In the case of membrane presses with a relatively large table, it is expedient to coat relatively small solids in relatively large numbers in one operation. These solids are therefore arranged on the table in the form of a grid and the frame is designed in a corresponding way in the form of a grid, so that it surrounds all solids in the same way.

An additional improvement in the coating of chipboards can be produced by evacuation of the boards. Chipboards, in particular wood dust chipboards, so-called MDF boards, are highly air-permeable and therefore good for evacuation. In the plastics coating, boreholes which penetrate the synthetic resin coating of the reverse side and make possible the escape of air or gases which accumulate during coating due to heating of the boards, due to adhesive evaporation and the like, have to be provided on the reverse side of the boards in any case. Suction lines can be connected to these boreholes. The evacuation has the effect that the adhesive is drawn deeply into the pores of the chipboard and becomes firmly anchored. Moreover, an even smoother contact of the sheet is produced.

A further embodiment comprises a frame surrounding the solid and following its outline at a distance, which can be laid on the plastic sheet and presses the latter against the table and in which boreholes for venting and/or air supply are provided.

The boreholes in the frame make it possible firstly for the air trapped in the space forming between the plastics sheet, the membrane and the frame to escape to the outside through the frame. The membrane can therefore come to rest against the plastics sheet over the entire surface. Furthermore, the boreholes can also be used after implementation of a coating operation for the introduction of air or another cooling gas, which on the one hand cools the sheet and on the other hand presses the sheet and the membrane apart so that the plastics sheet is detached from the membrane and is not drawn off by the latter during raising of the pressure cushion.

The venting on the one hand and the introduction of a cooling gas on the other hand may be performed via separate boreholes in the frame. However, the same boreholes may also be used, which are connected to a duct system which can be switched between a connection to the environment, possibly also with a vacuum source, and a connection to a cooling gas source.

The frame is preferably suspended flexibly underneath the pressure cushion, so that it is automatically lowered and raised with the latter and, during lowering, meets the plastics sheet before the pressure cushion and clamps it together with the table.

In the interests of a complete coating of the lateral borders as far as their lower edge, a raised pedestal is preferably provided on the table, onto which pedestal the solid to be coated is placed, so that the plastics sheet is drawn with the aid of the membrane over the lower edge of the lateral borders and down toward the table surface. The outline of the pedestal should be set back slightly in comparison with that of the solid. This too improves the adhesion of the sheet to the lower edges of the lateral borders.

In addition to the frame already described which can be laid onto the plastics sheet, a substantially congruent lower frame, laid onto the table or connected to the table surface, may be provided, by which, in interaction with the upper frame, the plastics sheet is clamped. A depression which surrounds the entire solid and into which the plastics sheet is pressed by the membrane is formed by the lower frame between the pedestal and the lower frame. While it is being pressed in, the sheet is stretched, so that it adapts itself smoothly to the shape of the lateral borders of the object. If at a suitable height, the lower frame at the same time has the effect that the plastics sheet is already clamped reliably at an early stage between lower frame and upper frame, before the membrane meets the plastics sheet. If the membrane is subsequently pressurized, it presses the plastics sheet completely into the recess between the pedestal and the lower frame. At the same time the plastics sheet heated through the membrane stretches and deforms, so that it can lie smoothly against the main surface and the borders of the object to be coated.

In the case of the rectangular solids in board form to be coated most frequently in practice, the upper frame and, if appropriate, also the lower frame take the form of a corresponding but larger rectangle, which surrounds the object with a space all around. This results in the frame being at a greater distance from the object at the corners due to the diagonal dimension than at the longitudinal and transverse sides. In this way, the sheet is stretched more at the corners, so that it can also come into contact here without folds.

Like the upper frame, the lower frame may also be provided with transversely directed boreholes. These boreholes make possible on the one hand an escape of air when the plastics sheet is pressed down by the membrane. In this case too, the transversely directed boreholes may be integrated into a duct system, via which the trapped air is positively evacuated, or that [sic] even makes possible the generation of a vacuum in the recess lying between the frame or frames and the pedestal, which assists the lowering of the sheet. However, this vacuum can at most have an assisting effect. A vacuum would, at most, suffice for simple applications as a single source for generation of the necessary contact pressure, as represented for instance in the case of the process described in U.S. Pat. No. 3,149,018, but not for the high-quality coating of furniture components aimed for here, including the peripheral borders of these pieces. Membrane presses of the type discussed here build up contact pressures of the order of 5 bar, while the contact pressures in vacuum coating are necessarily less than 1 bar.

The table for its part may be heated, so that, in particular in the depression surrounding the pedestal, heat rises and additionally heats the sheet in the region to be stretched. The heating of the sheet from below is also possible if, for production engineering reasons, a relatively thin metal plate is laid on the table, which plate bears the pedestal and, if appropriate, the lower frame and is, if appropriate, removable or laterally displaceable, so that the plate can be fitted with the object to be coated outside the press to the side in a readily accessible position. A plate which can be removed from the table on the other hand offers the possibility of carrying out an appropriate change-over in the event of a change in the shape of the objects to be coated.

Preferred exemplary embodiments of the invention are explained in more detail below with reference to the enclosed drawing.

FIG. 6 is a corresponding partial section at the moment of contact of the membrane on the plastics sheet.

Figure 1:
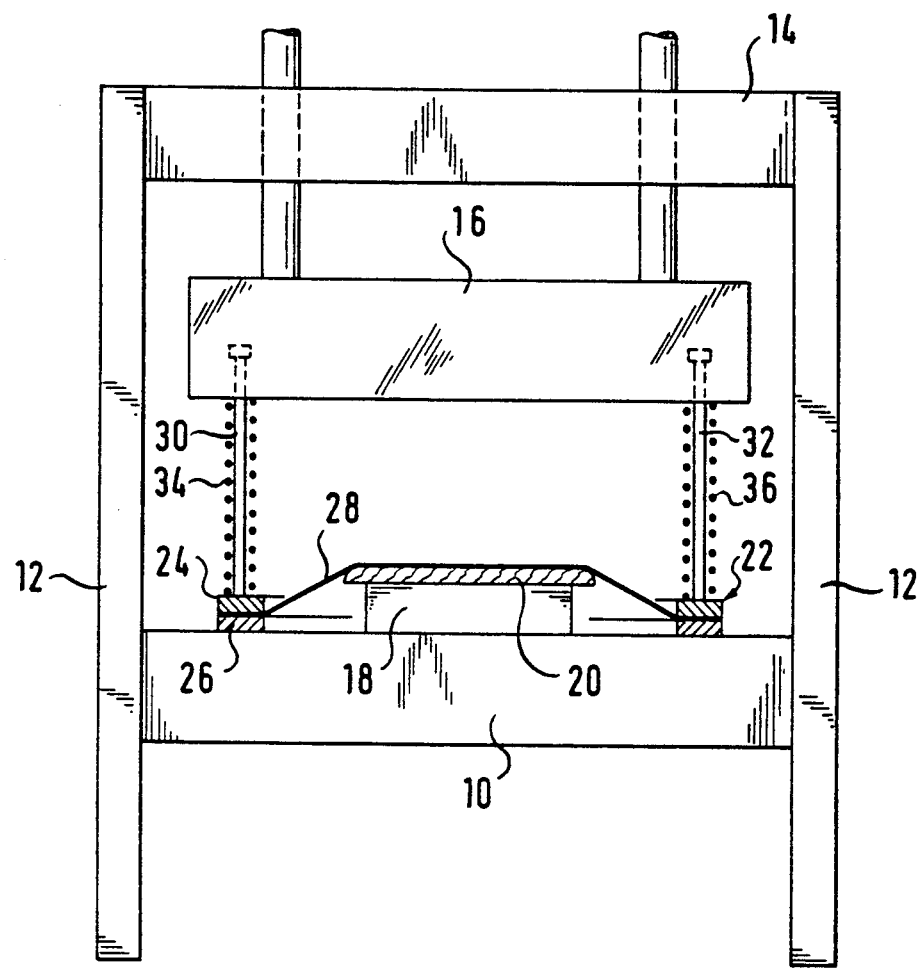
FIG. 1 is a diagrammatic view of an apparatus according to the invention.

In FIG. 1, as an example for the purposes of explanation, an apparatus is shown which comprises a table 10, supports 12 and a cross beam 14. Underneath the cross beam 14 there is suspended a lowerable upper ram 16, the lower pressure surface of which (not shown) is designed in a way known per se as an inflatable pressure cushion.

On the table 10 there is a holder 18, on which rests a solid to be coated, in the form of a rectangular door panel 20 of a kitchen closet.

Figure 2:
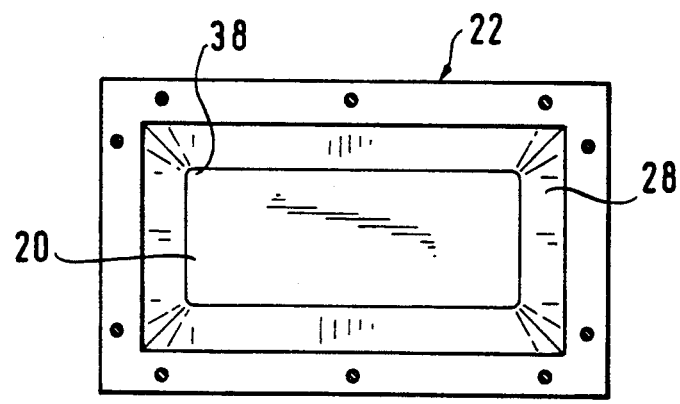
FIG. 2 shows a partial plan view corresponding to FIG. 1.

This door panel 20 is also represented in FIG. 2. The peripheral edges and corners of the door panel are rounded-off.

A frame 22 surrounds the door panel 20 on all sides. The shape and size of the frame are adapted to the shape and size of the door panel, and the frame follows the outer contour of the door panel 20 at a substantially constant distance. The panel 22 consists, for example, of two congruent frame parts 24, 26, which can be taken apart and between which a plastics sheet 28 can be clamped. For fixing the plastics sheet 28, the frame parts are clamped together by clamping devices (not shown).

After clamping of the sheet and after heating of the sheet, the frame can be lowered manually over the door panel 20. However, an automatic raising and lowering of the frame in coordination with the vertical movement of the upper ram 16 is more expedient. In the example represented, the frame is suspended on guide rods 30, 32, which are guided vertically displaceably in the upper ram 16. Compression springs 34, 36 pre-tension the frame 22 downward with respect to the upper ram 16, so that although the frame 22 is lowered at a distance ahead of the upper ram 16, the lowering movement of the upper ram 16 can be continued after contact of the frame 22 with the table 10.

During the lowering of the frame 22, the sheet 28 first lies smoothly against the upper surface of the door panel 20. Upon contact of the membrane, heated from the inside, with the sheet the latter is heated. It is then drawn down farther by the membrane, so that it approaches the lateral cut surfaces of the door panel and is stretched and deformed. At the same time, an increased stretching takes place in those regions of the door panel 20 which project outward from the periphery of the door panel, as for example in the region of the corner denoted by 38 according to FIG. 2. Due to the strong stretching of the plastics sheet 28 in this region, excess material is drawn off, and at the same time the sheet is adapted substantially to the shape of the corner by deformation. Subsequently, the sheet can be pressed into contact without any folds with the aid of the pressure cushion.

Figure 3:
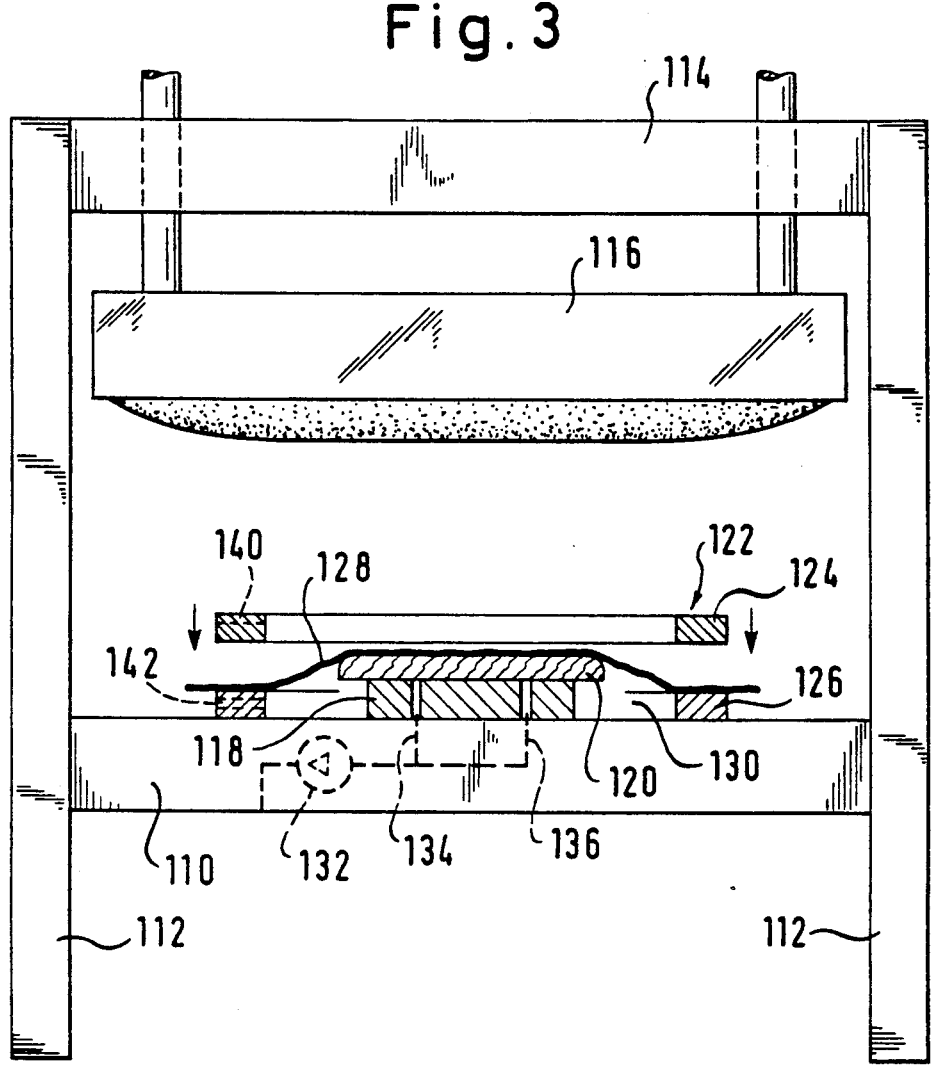
FIG. 3 is a diagrammatic view of a membrane press with the apparatus parts according to the invention.

A membrane press according to FIG. 3 comprises a table 110 with two supports 112 and a cross beam 114. Underneath the cross beam is suspended a lowerable upper ram 116, on the underside of which a membrane, without reference numeral, can be seen. This membrane forms a pressure cushion for the pressing of a sheet against a solid, as will be explained later. Above the membrane there are located in the upper ram 116 heating devices which heat the membrane and, via the latter, the sheet during the coating operation.

On the table 110 there is a rectangular pedestal 118, in the form of a board and raised in comparison with the table, on which pedestal a door panel 120 rests as an example of a solid to be coated. A rectangular frame 122 surrounds the door panel 120 on all sides at a constant distance.

In the example represented, the frame 122 consists of two congruent frame parts 124, 126. The lower frame part 126 rests directly on the table 110 and remains there permanently, in other words may also be an integral part of the table.

A plastics sheet 128 is laid on the door panel 120 and the lower frame part 126. Then the upper frame part 124, in congruent position above the lower frame part 126, is laid onto the plastics sheet 128.

During lowering of the upper ram, the membrane of the latter engages the upper frame part 124 and presses it firmly against the lower frame part 126, so that the sheet is clamped. When the plastics sheet 128 is adequately heated, it is pressed by the membrane into the space between the pedestal 118 and the frame 122 denoted by 130, until it completely fills this space. At the same time, the plastics sheet 128 is considerably stretched and deformed, and it lies without any folds around the entire lateral surfaces and in particular also around the corners of the door panel 120. Subsequently, the upper ram 116 and the upper frame part 124 are raised, and the overhanging sheet is trimmed from the coated door panel 120.

The lowering and raising of the upper frame part 124 may be performed manually, but may also be mechanized in a suitable way. For example, the upper frame part may be flexibly suspended underneath the upper ram 116.

Also indicated in FIG. 3 is a suction pump 132, with two suction lines 134, 136. The suction lines 134, 136 pass through the pedestal 118 into boreholes (not shown) in the reverse side of the door panel 120. In this way, gases can be evacuated from the inside of the door panel. At the same time, the adhesive to be applied to the door panel 120 before the laying of the sheet can be sucked deeply into the pores of the chipboard, and the contact of the sheet may also be improved additionally by evacuation, where this is necessary.

Figure 4:
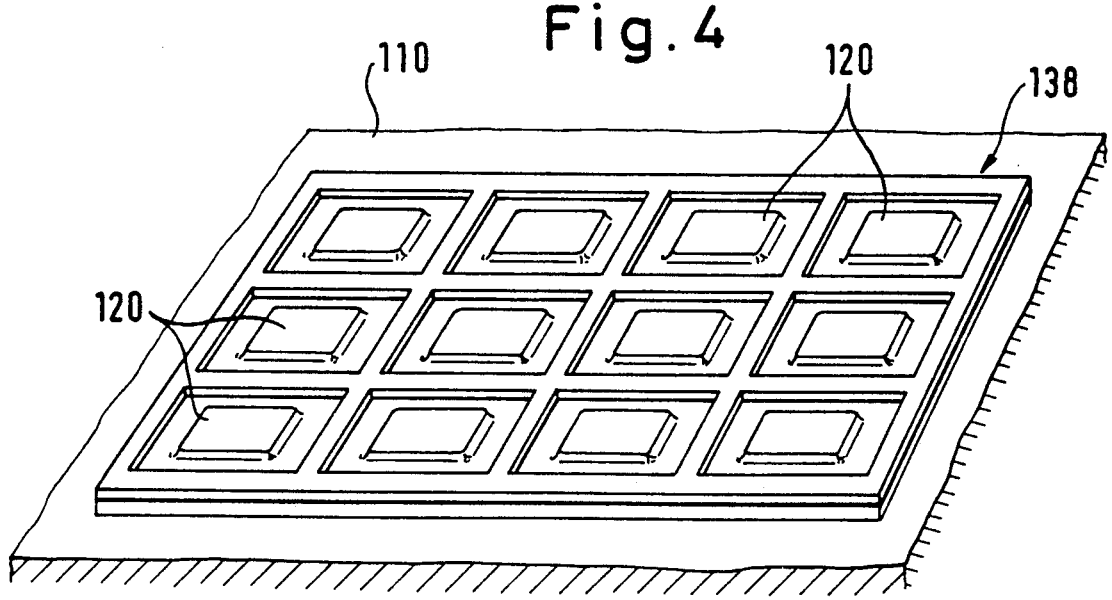
FIG. 4 is a diagrammatic perspective plan view of a table of a membrane press with a relatively large number of solids to be coated in grid-form arrangement.

FIG. 4 is a diagrammatic, perspective view of a table with a number of rectangular solids 120, for example door panels. The twelve door panels shown can be coated in one operation. In this case, a frame 138, in the form of a grid, is provided, which surrounds all door panels in the same way.

The height of the pedestal 118 and of the lower frame part 126 and the depth of the intermediate space 130 lying between the two are chosen so that the plastics sheet which is pressed down completely to the bottom of the intermediate space 130 can be adequately stretched and deformed.

Use of the frame 122 means that it may happen that air pockets are trapped during the contact of the membrane with the frame and during the subsequent forming operation. Air pockets between the membrane and the plastics sheet 128 may result in the pressure exerted on the membrane only being transferred inadequately to the sheet. Moreover, it is essential for the forming operation that the air entrapped by the table, the lower frame part and the sheet can escape. For these reasons, transversely directed boreholes or grooves which allow an escape of the trapped air may be provided in the two frame parts 124, 126. These boreholes or grooves are indicated in FIG. 3 by dashed lines and are denoted by 140, 142. In the case of the embodiment according to FIG. 4, the said boreholes or grooves may extend through all intermediate strips, so that a venting from inside to outside is possible.

Figure 5:
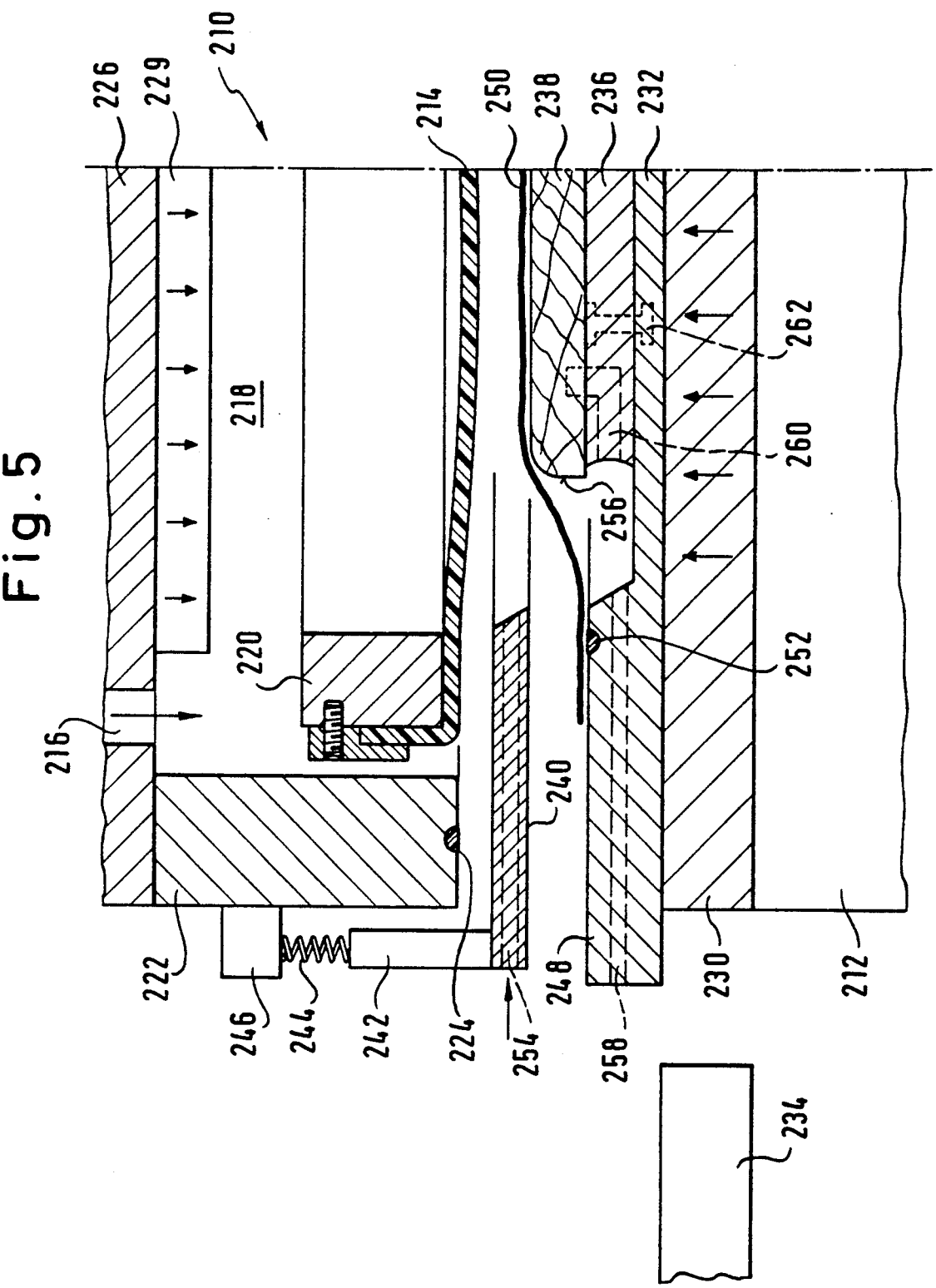
FIG. 5 is a vertical partial section through a membrane press designed according to the invention in a position which occurs before a coating operation.

The membrane press sketched in FIGS. 5 and 6 comprises a pressure cushion which is denoted overall by 210 and can move upward and downward on a frame (not shown), and a table 212 located underneath the pressure cushion. The pressure cushion 210 is formed essentially by a membrane 214, which seals off the bottom of a pressure chamber 218, to which air pressure can be admitted via an opening 216. The membrane 214 is clamped at its periphery in a holder 220 in the form of a frame, which is suspended in a way not shown within the pressure chamber 218. Towards the outside, the pressure chamber 218 is closed off by a sealing frame 222, into the lower surface of which a sealing strip 224 is recessed. Underneath the upper covering plate, denoted by 226, there are heat radiators 229 (not shown in detail), which give off heat downward in the direction of the arrow and heat the membrane 214.

The table 212 is designed in its upper region as a heating plate 230. For this purpose, for example, heating wires (not shown) are embedded in the table, or fluid ducts for a heating fluid are provided. In this way, heat is given off upward in the direction of the arrows, without any reference symbol. On the upper region of the table designed as a heating plate there rests a relatively thin plate 232, in particular of metal, which forms the actual table surface. The use of a plate only detachably connected to the table has the advantage that, for instance during a workpiece change or conversion for a different workpiece, this plate can be removed or, in particular, displaced laterally onto an indicated adjoining table 234 in order that the necessary work can be carried out outside the press without hindrance by the pressure cushion and without blocking any other operations which may be taking place.

A pedestal 236 in the form of a plate is detachably fixed on the plate 232. The pedestal 236 has, for example, a height of 10 to 20 mm, preferably of at least 14 mm. The pedestal 246 serves as receptacle for an object to be coated, for example a rectangular door panel 238 with rounded-off corners and edges, as is indicated in FIG. 5.

Under the pressure cushion 210 there is suspended a frame 240, which surrounds the door panel 238 around its entire periphery with equal width on all sides and, in the case of a rectangular door panel, likewise has the shape of a rectangle. The frame 240 is flexibly suspended on the outside of the sealing frame 222 with the aid of vertical shafts 242, springs 244 and attachments 246 attached to the sealing frame 232.

Underneath the frame 240 there is an essentially congruent lower frame 248, fixed on the plate 232 or designed in one piece with the latter. This lower frame 238 also surrounds the door panel 238 and the pedestal 236 around the entire periphery at a constant lateral distance.

During the coating of a door panel 238 with a plastics sheet, firstly, with press open, a plastics sheet 250 is laid on the door panel 238 and the lower frame 248, as is shown in FIG. 5. If the pressure cushion is then lowered, firstly the upper frame 240 meets the lower frame 248. At the same time, the plastics sheet 250 is clamped between the two frames. A sealing strip recessed into the lower frame 248 increases the clamping effect. The frames 240, 248 may also have a corrugation or the like on the mutually facing surfaces, which increases the clamping effect. Once the frames 240, 248 have clamped the plastics sheet 250 in the way described, a spring 244 is compressed during the further lowering of the pressure cushion. The sealing frame 222 comes to rest on the upper surface of the frame 240. The membrane 214 comes to rest in the entire inner region of the frame 240 on the plastics sheet 250, as is shown in FIG. 6, and heats the plastics sheet. The frame 240 has horizontal boreholes 254, through which the air trapped between the plastics sheet 250 and the membrane 214 can escape to the outside, since individual air pockets would impair the transfer of heat and pressure through the membrane.

The pressure within the pressure cushion is then gradually increased up to approximately 5 bar. At the same time, the membrane 218 comes to rest flatly against the upper surface of the door panel 238, and it is also pressed completely into the recess between the two frames 240, 248 on the one hand and the pedestal 236 with the door panel 238 on the other hand, until it meets the surface of the plate 232. Since the plastics sheet 250 has been heated through the membrane 214 from above and by the heating plate 230 or the plate 232 from below, it can follow this stretching movement. In so doing, it comes to rest completely smoothly against the outer borders 256 of the door panel 258. Since the pedestal 256 keeps the door panel 238 a certain minimum height above the plate 232 and is, moreover, set back in its outline by a few millimeters in comparison with the door panel 238, the plastics sheet 250 can be bonded to the lower, peripheral edge of the door panel 238 reliably and without any folds at the borders 256. At the four corners of a rectangular solid, such as a door panel, or at corresponding projections of other solids, the plastics sheet should be stretched more than at the smooth borders 256. This can be achieved, for example, by use of rectangular frames 240, 248 in conjunction with a rectangular door panel 238, as in this case, with constant lateral distances between the door panel and the frame, a particularly strong deformation takes place in the corners of the door panel due to the greater diagonal dimension. The result of this deformation is that the plastics sheet comes into contact without folds forming.

According to FIGS. 5 and 6, the lower frame 248 also has horizontal boreholes 258. These boreholes 258 likewise allow an escape of air during the lowering of the membrane 214 with the plastics sheet 250 into the recess between the frames 240, 248 and the door panel 238.

When the coating operation has been completed, the pressure cushion 210 is raised again. It may happen at this time that the relatively hot membrane 214 adheres to the plastics sheet 250 and takes the latter upward with it at least partially, so that the plastics sheet is in turn detached from the door panel 238 or at least partially destroyed. This can be prevented by the boreholes 254 in the upper frame 240 being used during the raising of the pressure cushion 210 for blowing in cooling air. Cooling air has the effect on the one hand that the plastics sheet is cooled and reduced in its adhesiveness and on the other hand that the membrane 214 and the plastics sheet 250 are pressed apart.

In the upper frame, separate boreholes 254 for venting on the one hand and the blowing-in of cooling air on the other hand may be provided, in a way not shown. The boreholes 254 may, however, also be combined to form a duct system, which is connected with the aid of suitable switching valves to the environment during venting and to a suitable cooling gas source in the cooling phase.

The boreholes in the lower frame 248, which make possible a venting of the intermediate space between the frames 240, 248 and the door panel 238 and the pedestal 236, may likewise be connected to a duct system (not shown), which may be brought into connection via suitable valves with a vacuum source. This produces the possibility of speeding up the venting of the intermediate space mentioned or, furthermore, of generating a more or less strong vacuum in the intermediate space, by which the sheet is drawn downward.

Provided that the solid to be coated is air-permeable, as is usually the case for example with chipboards or dust boards from wood materials, a vacuum may also be applied to the reverse side of the solid, which draws the sheet firmly into the pores of the fair side. For this purpose, there is indicated in the pedestal 236 a duct 260, which connects the intermediate space between the frames 240, 248 and the pedestal 236 to the reverse side of the door panel 238. The vacuum formed in the intermediate space therefore continues up to the reverse side of the door panel.

The pedestal 236 may be made up of individual parts, so that there is the possibility of making it up in each case to correspond to the size of the solid to be coated. For this purpose, rails 262, which are only indicated, are provided, which serve to hold the assembled parts of the pedestal and, under certain circumstances, also allow a displacement of the pedestal.

With the process according to the invention and the apparatus according to the invention, not only plastics sheets can be applied, but also other materials in sheet form, leather, veneer, felt, etc.

In the case of the embodiment shown in FIGS. 5 and 6, thermocouples, which make possible a relatively precise measurement and control of the temperature of the sheet, may be provided in the upper and lower frames.

I claim:

1. An apparatus for the plastics coating of three-dimensional solids comprising:
   a table for receiving a three-dimensional solid;
   a lowerable pressure cushion;
   a lowerable frame suspended underneath the pressure cushion at a distance for clamping and holding the edges of a plastics sheet to be coated on a three-dimensional object under tension during a coating operation, the frame following the outline of the solid at a distance; and
   means attached to the frame for raising the frame toward the pressure cushion.

2. An apparatus as claimed in claim 1, for the coating of rectangular solids in board form, wherein the frame (22) is rectangular and is at a constant distance from the borders of the solid (20) to be coated.

3. An apparatus for the plastics coating of three-dimensional solids, with a table for receiving a solid to be coated and a lowerable pressure cushion for pressing a plastics sheet against a solid, as claimed in claim 1, which comprises a frame (122) which can be laid onto the sheet (128) and presses the latter against the table (110).

4. An apparatus as claimed in claim 3, wherein the frame (122) comprises a lower frame part (126), assigned to the table (110), and a raisable and lowerable upper frame part (124), which can be laid onto the sheet (128).

5. An apparatus as claimed in claim 4, wherein the lower frame part (126) is an integral part of the table (110).

6. An apparatus as claimed in claim 4, wherein the frame (122) is located in the effective area of the pressure cushion.

7. An apparatus as claimed in claim 3, wherein the table (110) has a pedestal (118), raised with respect to the table surface, for receiving the solid (120), the outline of which is smaller than that of the solid.

8. An apparatus as claimed in claim 1 for the simultaneous coating of a number of three-dimensional solids, wherein the frame (138) is designed in the form of a grid corresponding to the arrangement of the solids (120) in the table (110).

9. An apparatus as claimed in claim 3, which comprises an evacuation device (132, 134, 136) for the evacuation of gases from the reverse side of the solid (120).

10. An apparatus comprising:
    a table for receiving a three-dimensional solid;
    a lowerable pressure cushion;
    a frame for clamping and holding the edges of a plastics sheet to be coated on a three-dimensional object under tension during a coating operation which can be laid onto the sheet and presses the sheet against the table, the frame following the outline of the solid at a distance; and
    an evacuation device for evacuating gases from the reverse side of the solid, wherein the evacuation device comprises suction lines which enter the solid through boreholes in the reverse side of the solid.

11. An apparatus, comprising:
    a table for receiving a three-dimensional solid;
    a lowerable pressure cushion;
    a frame for clamping and holding the edges of a plastics sheet to be coated on a three-dimensional object under tension during a coating operation; and
    boreholes or grooves directed transversely to the frame in the frame for venting.

12. An apparatus for the plastics coating of three-dimensional solids, the apparatus comprising:
    a table for receiving a three-dimensional solid;
    a lowerable pressure cushion for pressing a the edges of plastics sheet to be coated on a three-dimensional object under tension against the solid; and
    frame for clamping and holding a plastics sheet during a coating operation, which surrounds the solid and follows the outline of the solid at a distance, and which can be laid on the plastics sheet and presses it against the table, the frame comprising frame boreholes for venting of the frame interior and/or for air supply into the frame interior.

13. An apparatus as claimed in claim 12, wherein the outer ends of the boreholes are connected to a compressed air source.

14. In apparatus as claimed in claim 12, wherein the outer ends of the boreholes are connected to a cooling gas source.

15. An apparatus as claimed in claim 12, wherein the boreholes in the frame are integrated into a duct system which optionally allows the venting of the frame interior and the introduction of compressed and/or cooling gas.

16. An apparatus comprising:
    a table for receiving a three-dimensional solid;
    a lowerable pressure cushion;
    a frame for clamping and holding the edges of a plastics sheet to be coated on a three-dimensional object under tension during a coating operation, wherein the frame is suspended flexibly underneath the pressure cushion.

17. An apparatus as claimed in claim 16, wherein a pedestal (236) for receiving a solid (238) to be coated is provided on the table (212, 232).

18. An apparatus as claimed in claim 17, which comprises a lower frame (248), which is essentially congruent with the frame (240) and is attached on the table (212, 232).

19. An apparatus comprising:

a table;

a pedestal mounted on the table for receiving the solid to be coated;

a lowerable pressure cushion;

a frame for clamping and holding the edges of a plastics sheet to be coated on a three-dimensional object under tension during a coating operation; and a lower frame essentially congruent with the frame and attached to the table; the pedestal and the lower frame defining an intermediate space therebetween, wherein the lower frame has through boreholes for venting of the intermediate space between the lower frame and the pedestal during pressing of the plastics sheet.

20. An apparatus as claimed in claim 19, wherein the boreholes are connected to a vacuum source.

21. An apparatus as claimed in claim 17, wherein the pedestal and/or the lower frame are arranged on a plate laid on the table, which plate is detachably removable from the table.

22. An apparatus as claimed in claim 1, wherein the table (212) is designed in the upper region as a heating plate.

23. An apparatus as claimed in claim 1, wherein the means for raising the frame comprise springs.

24. An membrane press for the plastics coating of three-dimensional solids comprising:

a table for receiving a three-dimensional solid;

a lowerable membrane press pressure cushion;

a lowerable frame suspended underneath the pressure cushion at a distance for clamping and holding the edges of a plastics sheet to be coated on a three-dimensional object under tension during a coating operation, the frame following the outline of the solid at a distance wherein the plastics sheet is held by the frame during pressing with the membrane press pressure cushion.

25. An apparatus as claimed in claim 24, additionally comprising means attached to the frame for raising the frame toward the membrane press pressure cushion.

26. An apparatus as claimed in claim 25, wherein the means for raising the frame comprise springs.

27. An apparatus as claimed in claim 24, additionally comprising an evacuation device for evacuating gases from the reverse side of the solid, wherein the evacuation device comprises suction lines which enter the solid through boreholes in the reverse side of the solid and boreholes or grooves directed transversely to the frame in the frame for venting.

28. An apparatus as claimed in claim 24, wherein the frame is suspended flexibly underneath the pressure cushion.

29. An apparatus as claimed in claim 24, additionally comprising a pedestal mounted on the table for receiving the solid to be coated.

30. An apparatus as claimed in claim 29, wherein the lower frame is essentially congruent with the frame and attached to the table; the pedestal and the lower frame defining an intermediate space therebetween, wherein the lower frame has through boreholes for venting of the intermediate space between the lower frame and the pedestal during pressing of the plastics sheet.

* * * * *